United States Patent [19]

Everett

[11] 4,172,692

[45] Oct. 30, 1979

[54] PUMPING PLANT FLY WHEEL HYDRAULIC SURGE PROTECTOR

[76] Inventor: Wilhelm S. Everett, 3098 Solimar Beach, Ventura, Calif. 93001

[21] Appl. No.: 897,390

[22] Filed: Apr. 18, 1978

[51] Int. Cl.² .......................... F04B 17/00; F04B 49/06
[52] U.S. Cl. ...................................... 417/45; 417/374; 417/411; 417/540
[58] Field of Search ................... 417/411, 16, 45, 374, 417/540

[56] References Cited

U.S. PATENT DOCUMENTS

| 2,725,825 | 12/1955 | Cibattari | 417/374 X |
| 3,556,678 | 1/1971 | Oishi et al. | 417/411 X |

FOREIGN PATENT DOCUMENTS 955709  4/1964  United Kingdom ..................... 417/374

Primary Examiner—Richard E. Gluck
Attorney, Agent, or Firm—Ralph B. Pastoriza

[57] ABSTRACT

Hydraulic surge protection is provided in a pumping plant by providing a synchronous motor/generator connected across the electrical power bus lines used to energize the motor operated pumps for pumping liquid through a pipeline. A fly wheel is provided on the synchronous motor/generator having an inertia to maintain the motor/generator operating in the event of an electrical power failure between the bus lines and source of electrical energy to generate and feed current to the pump drive motors through the bus lines to maintain pumping operation thereof. This pumping operation is maintained a sufficient length of time to minimize separation of the liquid column being pumped in the pipeline to an extent that damaging water hammer is prevented.

5 Claims, 2 Drawing Figures

PUMPING PLANT FLY WHEEL HYDRAULIC SURGE PROTECTOR

This invention relates generally to hydraulic surge protectors and more particularly to a pumping plant utilizing unique hydraulic surge protecting means for liquid pumped through a pipeline by electrical motor driven pumps at the plant particularly directed towards eliminating or substantially reducing water hammer.

BACKGROUND OF THE INVENTION

Pumping plants for transferring liquid such as sewage from a "wet well" to the head works of a treatment station normally include some type of hydraulic surge protection means particularly directed towards eliminating or reducing water hammer. For example, where several large motor driven pumps are powered from electrical power bus lines for pumping the liquid through a fairly large capacity pipeline, should a power failure occur, the water column tends to separate in much the same manner as a series of freight cars pushed by a locomotive will separate if the driving locomotive slows or stops. Thus, if the pump pressure drops below vapor pressure, the water column in the pipeline can separate and results in severe water hammer.

The presently used surge protectors to avoid the foregoing problem may take many forms such as pneumatic surge chambers, pressurized stand pipes, one-way surge chambers, and so forth. These surge protectors are relatively bulky and massive and can increase substantially the cost of a pumping plant.

Another means for protecting against column separation would be to devise some system to keep the motor driven pumps operating after a power failure for a sufficient length of time to avoid column separation or at least reduce the column separation to a point where damaging water hammer is prevented. One manner of carrying out this concept would be to provide the motor driven pumps with fly wheels of sufficient inertia to maintain the pumps effectively in operation even should there be a power failure. The problem with attempting to use a fly wheel on the pump, however, is that most of the pumps particularly in large plants are of relatively low speed thereby limiting the amount of energy that can be stored in a fly wheel attached to the pump. Also, there are encountered problems in actually physically affixing the fly wheel to the pump.

BRIEF DESCRIPTION OF THE PRESENT INVENTION

The present invention contemplates a unique type of hydraulic surge protector for pumping plants which not only prevents damaging water hammer to the end that conventional type surge alleviators may be eliminated or at least vastly reduced in size and expense, but also inherently improves the overall operation of the plant in that the protector functions to improve the power factor thereby reducing energy costs and further as a load leveler; that is, a smoothing out of surges resulting from flow fluctuations in the pipeline and the power inrush in starting additional motor driven pumps.

Briefly, all of the foregoing is accomplished by providing a pumping plant including motor driven pumping means for pumping liquid through a pipeline powered from electrical power bus lines connected to a power source. A synchronous motor/generator is connected across the power bus lines and a fly wheel provided on the synchronous motor/generator. The rotational speed of the synchronous motor/generator are substantially greater than that of the motor driven pumps and the fly wheel in turn can be appropriately dimensioned with respect to mass and radius to provide an inertia to maintain the motor/generator operating in the event of an electrical power failure between the bus lines and source. The continued operation of the synchronous motor/generator by the energy stored in the fly wheel will cause the motor/generator to function as a generator and feed current to the motor driven pumping means through the bus lines to maintain the pumping operation thereof. This pumping operation is maintained a sufficient length of time to minimize separation of the liquid column being pumped in the pipeline to an extent that damaging water hammer is prevented. The motor/generator and fly wheel thus function as a surge accumulator in the pumping plant.

To avoid sending generated current back towards the source in the electrical power bus lines, a reverse current responsive switch means is provided in the power bus lines and in addition, the normally provided low voltage responsive cut-out switches in the motor driven pump starters are altered so that the pump motors will still operate under reduced voltage conditions occurring as the fly wheel generator slows down.

The synchronous motor/generator, itself when functioning as a motor across the electrical power bus lines further acts as a synchronous capacitor to improve the power factor at the source connection to the electrical power bus lines thereby reducing overall power demands and consequently reducing energy costs.

Finally, the synchronous motor/generator further functions as a load leveler by reducing power demand resulting from large flow rate changes and electrical surges when additional motor driven pumps are connected across the power bus lines.

BRIEF DESCRIPTION OF THE DRAWINGS

A better understanding of this invention will be had by now referring to a specific example of the invention as shown in the accompanying drawings in which.

DETAILED DESCRIPTION OF THE PREFERRED EMBODIMENT

Figure 1:
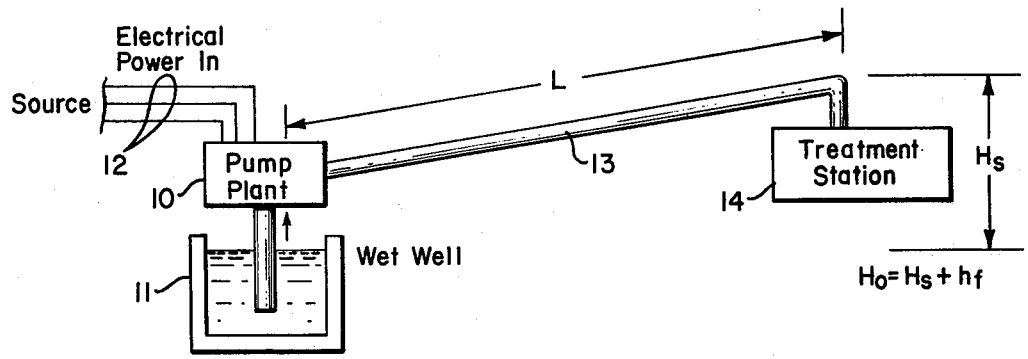
FIG. 1 is a highly schematic diagram of a pump plant for pumping sewage liquid from a wet well to a treatment station wherein the pump plant incorporates the fly wheel hydraulic surge protector of this invention; and, FIG. 2 is another highly schematic block type diagram of the basic components incorporated in the pumping plant of FIG. 1.

Referring first to FIG. 1, there is schematically indicated by the block 10 a pumping plant for pumping liquids such as from a wet well 11. The pump plant normally includes one or more pumps of the propeller type or centrifugal type or sometimes a combination of both types. These pumps are driven by large electric motors in turn powered from an appropriate source as by power lines 12.

The liquid sewage by way of example is illustrated in FIG. 1 as being pumped along a pipeline 13 to the head works of a sewage treatment station indicated by the block 14.

In the illustrative examples set forth, the pipeline 13, oftentimes referred to as a force line, has an overall length L and the static head pumped is indicated at Hs.

The total "head" against which the pumps work is designated "Ho" and is equal to the sum of the static head Hs and the head resulting from pipe friction designated hf.

Figure 2:
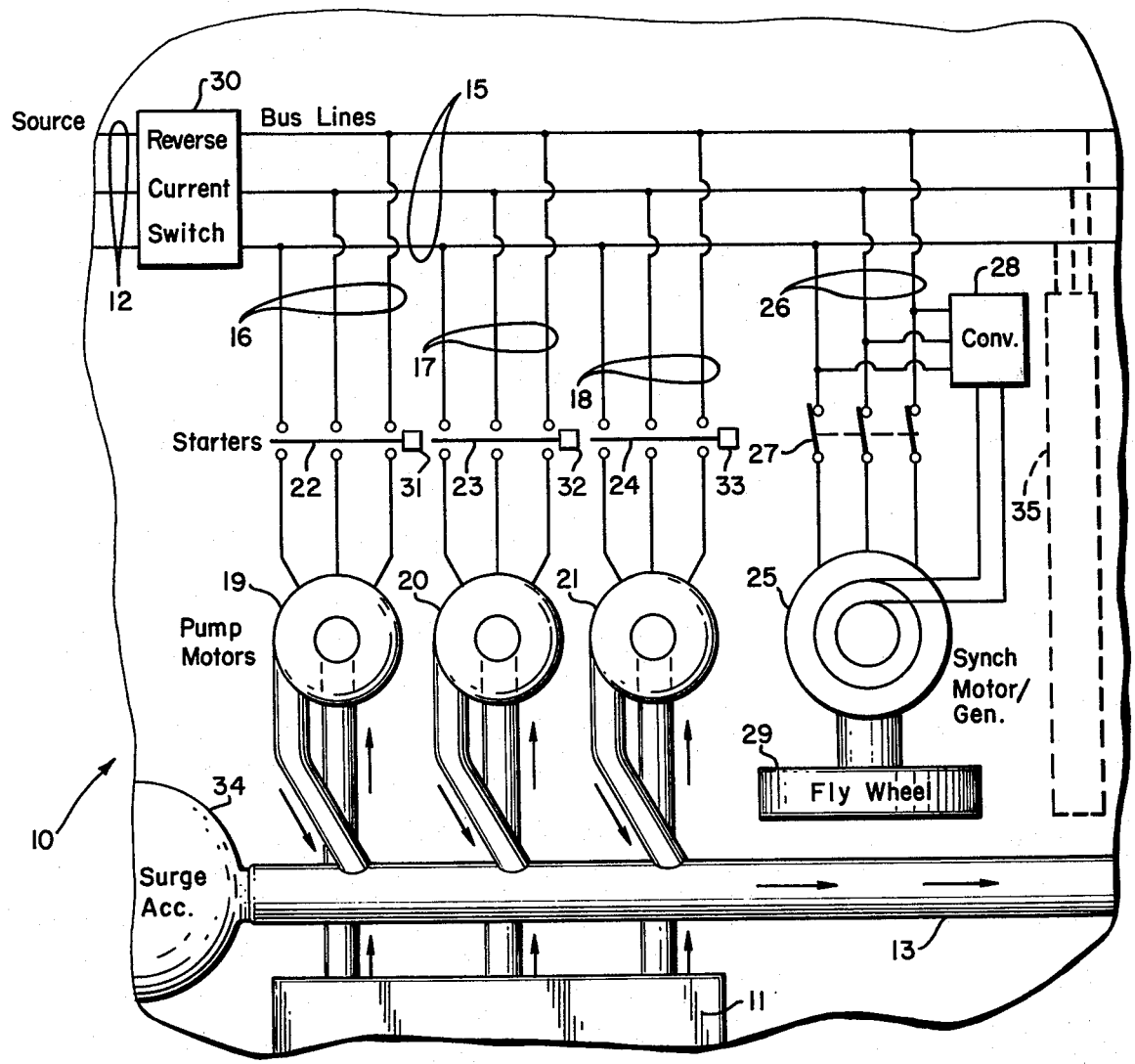

Referring now to the detailed showing of FIG. 2, the input power source on lines 12 connect to electrical power bus lines 15. Appropriate input connecting lines designated 16, 17 and 18 respectively connect to pumping motor means which, in the example set forth, includes three motor driven pumps 19, 20 and 21 respectively. Appropriate pump motor starters are schematically indicated in the input connecting lines at 22, 23 and 24 for the three pump motors set forth.

The liquid line 13 described in FIG. 1 initiates in the pump plant 10 as shown in FIG. 2 and connects to the outputs of the three pumps. The inputs to these pumps connect to the wet well 11.

The hydraulic surge protector of this invention takes the form of a synchronous motor/generator 25 having input leads 26 connected to the power bus lines 15 as shown. A suitable switch 27 is provided in these leads and an appropriate diode converter for the field is indicated at 28.

A fly wheel 29 in turn is secured to the shaft of the synchronous motor/generator 25 and has a given mass and radius to provide an inertia to maintain the motor/generator operating in the event of an electrical power failure between the bus lines 15 and source connecting to the electrical lines 12. When the synchronous motor/generator is driven by energy from the fly wheel 29, the same functions as a generator or alternator to generate and feed current to the various pumping motors by way of the bus lines 15 to maintain the pumping operation thereof. As mentioned heretofore briefly, this operation of the pumps is maintained a sufficient length of time to minimize separation of the liquid column in the pipeline 13 to an extent that damaging water hammer is prevented.

In order to utilize the synchronous motor/generator in the foregoing manner, it is necessary to provide some means for opening the circuit between the electrical power bus lines 15 and the original source of the electrical energy in order to avoid feeding the reverse current back along the line towards the source. To this end, there is provided in the power bus lines 15 a reverse current responsive switch means designated generally by the block 30 between the connection of the lines to the source and the input connections to the pumping motor means and synchronous motor/generator. This reverse current responsive switch means will simply disconnect the power bus lines from the source in response to the presence of reverse current provided by this synchronous motor/generator 25 when a power failure occurs.

In addition to the reverse current responsive switch 30 it is also necessary to modify the normally provided low voltage protection devices in the starters 22, 23 and 24. The modified protection devices are schematically indicated by the blocks 31, 32 and 33 for the motor starters respectively. The modifications are such as to make the devices responsive only to a main power failure to change the sensitivity of each magnetic motor starter 22, 23 and 24 in such a manner as to allow the motors 19, 20 and 21 to stay on line at a lower voltage and lower frequency than normal. The pumps will thus still be operated by the motors even though the reverse voltage and frequency supplied by the synchronous motor/generator 25 gradually decreases as the fly wheel energy is used up.

While the provision of the synchronous motor/generator and fly wheel components to the pumping plant can in certain instances provide the total amount of surge protection necessary, in larger plants it may be desirable to include additional hydraulic surge protection means such as a surge accumulator indicated at 34 in FIG. 2 in the liquid pipeline 13. However, such additional hydraulic surge protector can be of substantially less size and cost as would otherwise be required in the absence of the synchronous motor/generator and fly wheel.

It should also be understood that a stand-by synchronous motor/generator and fly wheel may be provided, indicated schematically by the phantom lines 35, and sized to work with or as a substitute for the synchronous motor/generator 25 and fly wheel 29.

In addition to water hammer prevention, the synchronous motor/generator and fly wheel arrangement, when running as a motor by power from the electrical power bus lines, also functions as a synchronous capacitor to improve the power factor at the source connection 12 to the electrical power bus lines 15 thereby reducing overall power demands and subsequently reducing energy costs. Moreover, the same synchronous motor/generator and fly wheel further functions as a load leveler by reducing power demand resulting from large flow rate changes in the pipeline 13 and electrical surges when additional motor driven pumps are connected across the power bus lines 15.

The primary function and essence of the present invention, however, is the ability of the synchronous motor/generator and fly wheel to provide the heretofore described surge protection. In this respect, and as also mentioned heretofore, the mass and radius of the fly wheel must be determined to provide along with the synchronous motor/generator itself a total moment of inertia for a given revolutions per minute of the motor/generator to effectively maintain operation of the pump motors a sufficient length of time to prevent damaging water hammer as a result of column separation. This dimensioning will, of course, depend upon the types and physical characteristics of the pump motors and pumps involved as well as parameters of the pipeline through which the liquid is pumped.

There are available in the literature curves of head pressure versus velocity for different specific speed pumps. These curves are expressed as "alpha" which is speed ratios to the rated speed and "beta" which is torque ratios to the rated torque. By providing sufficient inertia so that the pumps will reduce speed slowly, the water column will not separate or will only separate when any resulting water hammer would be insignificant.

By utilizing a pump characteristic curve for the particular pump in the pumping plant under consideration, the slope of the surge line may be drawn into the curve. The bottom of the surge curve must not be below about −20 ft. of head as depicted by the ordinate of the pump characteristic curve at which point column separation and vaporization of the water occur.

The normal time increment from the time that the pump plant shuts down to when the column of water in the pipeline will come to rest is given by twice the length L of the pipeline divided by the speed of sound in the pipeline, this quantity being referred to as the celerity and normally being designated by the letter a.

Knowing the total moment of inertia Ip at Np revolutions per minute of the pumping motor means and also the total given rated torque, rated speed and rated flow rate $q_o$ at the rated speed, and by selecting the appropriate alpha and beta factors from the pump characteristic curve for a pump head Ho greater than −20 ft., the necessary moment of inertia $I_G$ of the synchronous motor/generator and fly wheel at $N_G$ revolutions per minute can be computed from the following formula:

$$.7N_G^2 I_G + N_p^2 I_p = \frac{1 \pm \beta}{1 - \alpha} K q_o H_o \left( \frac{2L}{a} \right)$$

where again, $\beta$ = the ratio of the pump torque at any given time to the rated torque
$\alpha$ = the ratio of the pump speed at any given time to the rated speed
K = a constant
$H_o$ = the static head plus the friction head
L = the length of the pipeline
a = celerity or speed of sound in the pipeline when filled with liquid.

In essence, the surge protector of this invention adds a fly wheel to the pumps through electrical connections rather than through mechanical connections.

From all of the foregoing it will be evident that the present invention has resulted in a substantial improvement in pumping plant operation not only from the standpoint of surge protection as described but also because of the improved power factor and load leveler characteristics provided by the synchronous motor/generator and fly wheel.

I claim:

1. A pumping plant fly wheel hydraulic surge protector including, in combination:
   (a) motor driven pumping means for pumping liquid through a pipeline;
   (b) electrical power bus lines connected to a power source and having input connections to said motor driven pumping means for operating the same;
   (c) a synchronous motor/generator having input leads connected to said power bus lines; and
   (d) a fly wheel on said synchronous motor/generator having a given mass and radius to provide an inertia to maintain said motor/generator operating in the event of an electrical power failure between said bus lines and source, to generate and feed current to said motor driven pumping means through said bus lines to maintain pumping operation thereof a sufficient length of time to minimize separation of the liquid column being pumped in said pipeline to an extent that damaging water hammer is prevented whereby said motor/generator and fly wheel function as a surge accumulator in said plant.

2. A pumping plant according to claim 1, including a reverse current responsive switch means in said electrical power bus lines between the connection of said lines to said source and the input connections to said motor driven pumping means and synchronous motor/generator, for disconnecting the power bus lines from said source when a power failure occurs resulting in reverse current flow from said synchronous motor/generator when functioning as a generator.

3. A pumping plant according to claim 1, including additional hydraulic surge protection means in said pipeline to further aid against water column separation.

4. A pumping plant according to claim 1, including a stand-by synchronous motor/generator having a fly wheel sized to work with or as a substitute for said first mentioned synchronous motor/generator and fly wheel.

5. A pumping plant according to claim 1, in which said pumping motor means exhibits a total moment of inertia Ip at Np revolutions per minute and has a total given rated torque, rated speed and rated flow rate $q_o$ at said rated speed, and in which the moment of inertia $I_G$ of said synchronous motor/generator and fly wheel at $N_G$ revolutions per minute can be computed from the following formula:

$$.7N_G^2 I_G + N_p^2 I_p = \frac{1 \pm \beta}{1 - \alpha} K q_o H_o \left( \frac{2L}{a} \right)$$

where:

$\beta$ = the ratio of the pump torque at any given time to the rated torque
$\alpha$ = the ratio of the pump speed at any given time to the rated speed
K = a constant
$H_o$ = the static head plus the friction head
L = the length of the pipeline
a = celerity or speed of sound in the pipeline when filled with liquid.

* * * * *